Dec. 26, 1944.  C. E. PETERSON ET AL  2,366,050
TOOL SUPPORT
Filed Oct. 15, 1941
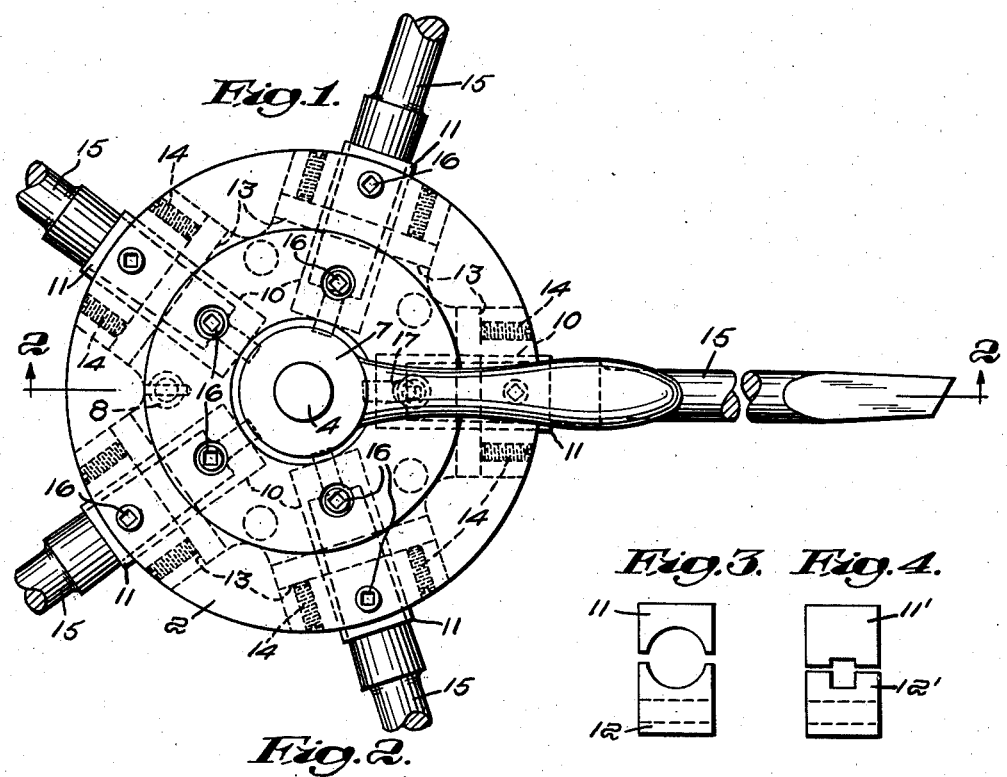
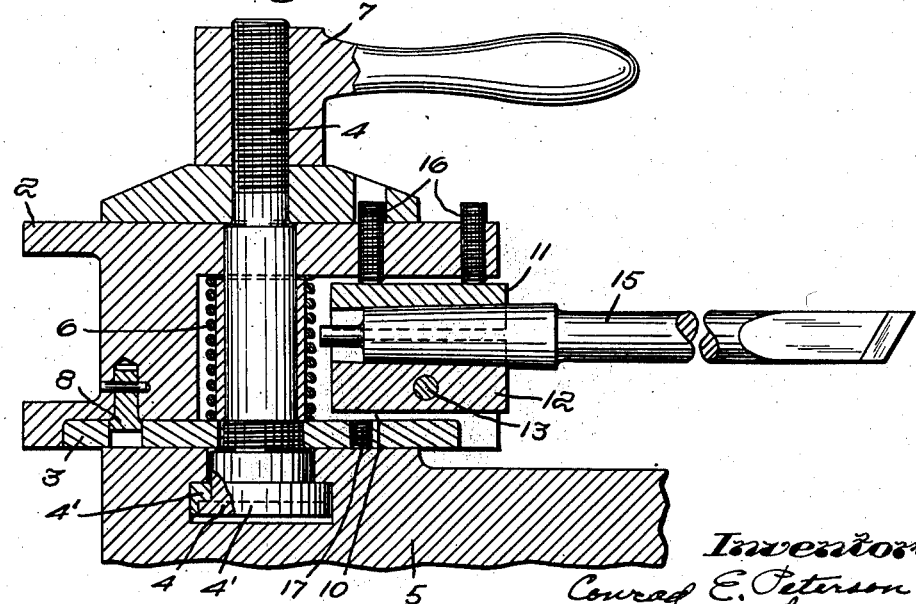
Inventors:
Conrad E. Peterson
and
Gordon L. Olson,
by J. H. McCrady,
Attorney.

Patented Dec. 26, 1944

2,366,050

UNITED STATES PATENT OFFICE 2,366,050

TOOL SUPPORT

Conrad E. Peterson, Auburndale, and Gordon L. Olson, Arlington, Mass.

Application October 15, 1941, Serial No. 415,050

1 Claim. (Cl. 29—48)

This invention relates to machine tools and is more especially concerned with the structures in which the tool or tools in such machines are mounted for operation on the work.

The invention will be herein disclosed as embodied in a turret structure adapted to be used either in a turret lathe or in an engine lathe, it being understood, however, that the invention is not limited in its application to use in either of these machines.

When a turret is mounted on the tool carriage or "compound" of an engine lathe, the regular adjustments commonly used in presenting the tool to the work may be employed, but if a series of such tools are to be used and the elevations at which they operate on the work vary from each other, then the matter of adjusting the tools becomes more complicated, often requires shimming, and consumes valuable time of a skilled worker.

The present invention is especially concerned with considerations of this nature, and it aims to devise a tool mounting which will facilitate the accurate setting and adjustment of the tools.

The nature of the invention will be readily understood from the following description when read in connection with the accompanying drawing, and the novel features will be particularly pointed out in the appended claims.

In the drawing,

Figure 1 is a plan view of a turret equipped with tool holders embodying features of this invention;

Fig. 2 is a vertical, sectional view approximately on the line 2—2, Fig. 1; and

Figs. 3 and 4 are end views of typical tool holders adapted to be used in the turret shown.

In the construction illustrated in the drawing, the turret comprises a body 2 mounted to rotate on a stationary index plate 3, around a post 4, and the lower portion of said post projects loosely through a hole in a plate 4', its flanged end fitting freely in the T-slot of the upper slide 5 of a compound. This post has a threaded engagement with the index plate 3 and it projects upwardly for a considerable distance above the turret body and is threaded at its upper end to receive a nut 7 provided with a handle. In assembling this structure on a compound, the lower flanged end of the post with its plate 4' are slipped into the T-slot of the tool carriage or compound, the index plate 3 is threaded on to the post and is tightened up, either by rotating the plate itself or the post. When the plate has been properly located it is secured there by turning down the set screw 17. The spring 6 and the sleeve which it encircles are then slid on to the post which is now held stationary by its association with the plate and the slide 5, as just described; the body 2 of the turret is slipped on to the post, together with the heavy washer at the upper end of it, and then the nut 7 is threaded on to the upper end portion of the post.

Thereafter the turret body is located in any indexed position by the pin 8 which enters any desired one of a series of holes in the index plate, after which the turret body is forced downwardly by revolving the nut 7, thus locking said body securely to the plate 3. When it is desired to change the position of the turret, the clamping nut 7 is backed off to release said body, which thereupon is lifted by the spring 6 until the stud 8 is withdrawn from the hole in which it has been positioned. This allows the body to be rotated about the axis of the post to a new position where it will be secured by turning down the nut 7 again.

So far as the general turret structure is concerned, it may be of any suitable character.

For the purposes of this invention the turret body is provided with a series of radial slots 10 extending inwardly from the edge thereof, and each adapted to receive a tool holder. Preferably the holder used comprises upper and lower sections 11 and 12, respectively, and the lower section is drilled transversely to receive a pivot pin 13 which is held in place by set screws 14. The slots have upright walls laterally confining the parts of the holder with only sufficient play for easy movement, and the opposed faces of the two sections 11 and 12 are shaped, as indicated for instance in Figs. 3 and 4, to cooperate in forming a socket of such contour as to grip the shank of a tool or tool "bit" 15. Threaded through the portion of the turret immediately above the slot 10 are two set screws 16 which, as clearly shown in Fig. 2, bear on the upper section 11 of the tool holder in line with the socket in it and at opposite sides of the axis of the pivot 13. Consequently, by turning up these set screws, the tool 15 may be clamped securely between the two sections of the tool holder. Also, by backing out one screw and turning up the other the angle of the tool may be adjusted in a vertical plane, this adjustment taking place around the pivot 13. Thus the screws operate not only to clamp the tool in the holder, but also to adjust the angle of the tool and to hold the tool in its adjusted position.

The same construction is used in any desired number of the five slots provided in the turret so that any number of tools may be used in it up to the capacity for which it is designed. Also, each of these tools may be adjusted independently of the other to suit the requirements of the particular operation which it is to perform on the work. Naturally the particular kind of tools used and the number of them, will depend upon the requirements of the individual jobs. It should be observed that the tool gripping surfaces of the clamping sections 11 and 12 can readily be machined or ground to fit accurately the bits used for any individual piece of work, and that these jaws provide gripping surfaces of large area. This fact, together with the nature of the clamping devices provided, means that the tools may be gripped very rigidly and securely and danger of breaking them due to uneven clamping pressure can be minimized.

It will be evident to those skilled in this art that such a construction as that above described materially facilitates a machinist's work in making the initial adjustment of the tools required for a particular job, in shifting from one tool to another, and in replacing tools after they have been ground and bringing them again into their correct positions.

In changing tools, if a different construction of a tool holder jaw is required, the set screws 14—14 for any individual slot may be backed out, thus releasing the pivot pin 13 for that slot, whereupon it may be driven out, the jaws previously used may be removed and instantly replaced with a new pair of the desired shape for the new tool. The matter of re-inserting the pivot pin and securing it in place requires but a moment's time, and the clamping and adjustment of the tool in its proper position may be performed quickly in the manner above described. It should also be observed that the index plate 3 can be revolved about the post 4 in order to bring the tool holders into the desired relationship to the work and that when the turret has been so adjusted it can be locked in its adjusted position by turning up the set screw 17, Fig. 1, which is threaded through the index plate in position to bear on the upper machine surface of the slide 5. This adjustment is quite independent of the indexing movements of the turret.

While we have herein shown and described a preferred embodiment of our invention, it is contemplated that the invention may be embodied in other forms without departing from the spirit or scope thereof.

Having thus described our invention, what we desire to claim as new is:

In a tool supporting structure, the combination of a turret mounted for indexing movement, said turret being provided with a plurality of upright slots in the edge thereof, a tool holder positioned in one of said slots and adapted to support a tool in an approximately horizontal position, a pivot extending horizontally through said slot transversely thereto, said holder being divided into upper and lower sections and the lower section being supported on said pivot but the upper section being loose vertically in its slot but closely confined laterally thereon, and two screws threaded through a portion of said turret above said slot in position to bear on the upper section of the holder positioned therein and thus to force the upper section toward the lower section, said screws being positioned at opposite sides of the axis of said pivot whereby they are operable to adjust said holder angularly about said axis.

CONRAD E. PETERSON.
GORDON L. OLSON.